United States Patent
Luo et al.

(10) Patent No.: US 10,588,163 B2
(45) Date of Patent: Mar. 10, 2020

(54) WIRELESS BACKHAUL CONNECTION ESTABLISHMENT METHOD AND APPARATUS

(71) Applicant: HUAWEI TECHNOLOGIES CO., LTD., Shenzhen OT (CN)

(72) Inventors: Zezhou Luo, Shenzhen (CN); Hongcheng Zhuang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 86 days.

(21) Appl. No.: 15/901,105

(22) Filed: Feb. 21, 2018

(65) Prior Publication Data
US 2018/0184470 A1    Jun. 28, 2018

Related U.S. Application Data

(63) Continuation of application No. PCT/CN2015/087816, filed on Aug. 21, 2015.

(51) Int. Cl.
*H04W 76/10* (2018.01)
*H04W 48/20* (2009.01)
(Continued)

(52) U.S. Cl.
CPC .......... *H04W 76/10* (2018.02); *H04W 36/30* (2013.01); *H04W 48/20* (2013.01);
(Continued)

(58) Field of Classification Search
CPC ..... H04W 76/10; H04W 72/04; H04W 88/08; H04W 36/30; H04W 48/20; H04W 72/0413
See application file for complete search history.

(56) References Cited

U.S. PATENT DOCUMENTS

| | | | |
|---|---|---|---|
| 2009/0264123 A1 | 10/2009 | Agashe et al. | |
| 2013/0310052 A1* | 11/2013 | Timus | H04W 72/0433 455/445 |
| 2014/0126462 A1* | 5/2014 | Vardhan | H04B 7/15507 370/315 |

FOREIGN PATENT DOCUMENTS

| | | | |
|---|---|---|---|
| CN | 102017722 A | 4/2011 | |
| CN | 103428803 A | 12/2013 | |

(Continued)

OTHER PUBLICATIONS

Draft IEEE Standard for Local and metropolitan area networks,Part 16: Air Interface for Fixed Broadband Wireless Access Systems,IEEE P802.16-REVd/D5, May 2004,total 915 pages.
(Continued)

*Primary Examiner* — Kyaw Z Soe
(74) *Attorney, Agent, or Firm* — Kilpatrick Townsend & Stockton LLP

(57) ABSTRACT

Embodiments of the present invention disclose a wireless backhaul connection establishment method and apparatus. According to the embodiments of the present invention, a first base station obtains a valid backhaul capability of a neighboring base station, where the neighboring base station is a base station that can perform wireless communication with the first base station, and the valid backhaul capability reflects a maximum capability of a base station to serve a newly-added backhaul service; the first base station selects an upstream base station from the neighboring base station according to the valid backhaul capability of the neighboring base station and a backhaul service requirement for the first base station, where the upstream base station is configured to provide a wireless backhaul relay service for the first base station; and the first base station establishes a wireless backhaul connection with the upstream base station.

11 Claims, 6 Drawing Sheets

(51) Int. Cl.
*H04W 36/30* (2009.01)
*H04W 72/04* (2009.01)
*H04W 88/08* (2009.01)
H04W 84/04 (2009.01)
H04W 28/16 (2009.01)

(52) U.S. Cl.
CPC ....... *H04W 72/0413* (2013.01); *H04W 88/08* (2013.01); *H04W 28/16* (2013.01); *H04W 84/042* (2013.01); *H04W 84/047* (2013.01)

(56) References Cited

FOREIGN PATENT DOCUMENTS

| | | |
|---|---|---|
| JP | 2015002431 A | 1/2015 |
| WO | 2012105881 A1 | 8/2012 |

OTHER PUBLICATIONS

IEEE Standard for Local and metropolitan area networks,Part 16: Air Interface for Broadband Wireless Access Systems, Amendment 1: Multihop Relay Specification,IEEE Std 802.16j™ -2009,total 314 pages.

\* cited by examiner

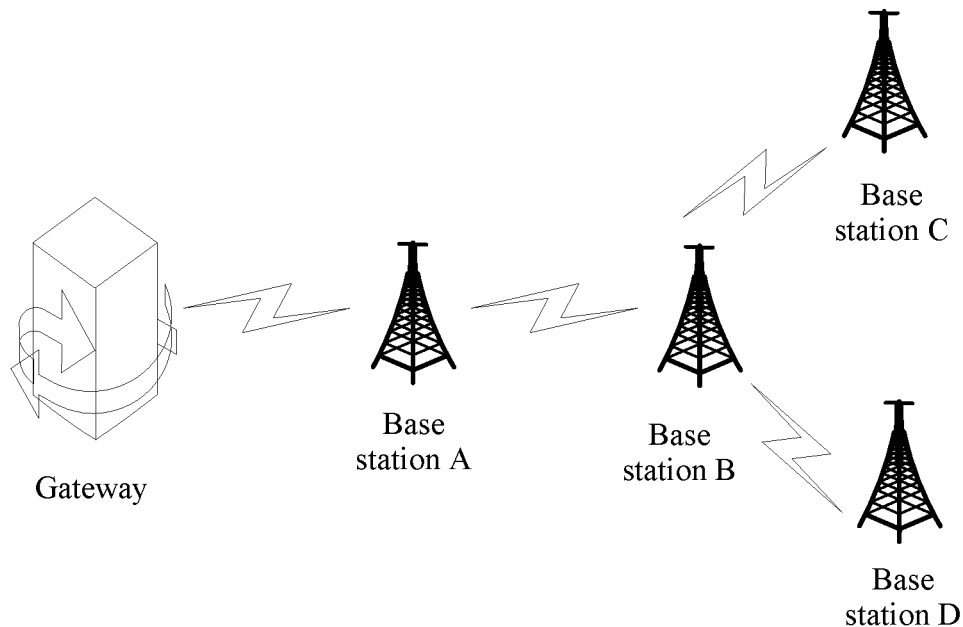

FIG. 1

```
A first base station obtains a valid backhaul capability of a neighboring
base station, where the neighboring base station is a base station that can
   perform wireless communication with the first base station, and the
 valid backhaul capability is a maximum capability of a base station to
             serve a newly-added backhaul service
```
— 201

```
     The first base station selects an upstream base station from the
 neighboring base station according to the valid backhaul capability of
the neighboring base station and a backhaul service requirement of the
   first base station, where the upstream base station is configured to
    provide a wireless backhaul relay service for the first base station
```
— 202

```
The first base station establishes a wireless backhaul connection with
                      the upstream base station
```
— 203

FIG. 2

WIRELESS BACKHAUL CONNECTION ESTABLISHMENT METHOD AND APPARATUS

CROSS-REFERENCE TO RELATED APPLICATIONS

This application is a continuation of International Patent Application No. PCT/CN2015/087816, filed on Aug. 21, 2015, which is hereby incorporated by reference in its entirety.

TECHNICAL FIELD

The present invention relates to the field of wireless communications technologies, and in particular, to a wireless backhaul connection establishment method and apparatus.

BACKGROUND

A UDN (Ultra-Dense Network, ultra-dense network) is a network with high station density, a large quantity of stations, and a short inter-station distance. A station address of a base station in the UDN network is generally selected on a facility that is convenient for construction, such as a light pole or an outer wall of a building along a street, and coverage and a capacity of the base station can be flexibly provided. However, this address selection manner is not conducive to configuration of a high-power power supply and fiber backhaul. In addition, there is a large quantity of micro base stations, and there is a plug-and-play usage manner. Therefore, factors such as networking costs and networking flexibility are comprehensively considered, and wired backhaul cannot be configured for each micro base station.

In a current UDN network, some base stations have high-performance wired backhaul. These base stations are macro base stations and can be used as gateways to help a wireless backhaul micro base station to backhaul data. To enlarge a coverage area of a cell, an MR (Mobile Relay, mobile relay) is used between the macro base station and the micro base station. When accessing a network, the MR needs to select an upstream node of the MR, and the upstream node is the macro base station or the MR that has accessed the network. A method for selecting the upstream node is that the macro base station and the accessed MR broadcast a DCD (Downlink Channel Descriptor, downlink channel descriptor) message, where the DCD message includes a hop count between the accessed MR and the macro base station; and a to-be-accessed MR receives the DCD message, and selects a proper accessed MR or a macro base station as the upstream node according to the hop count between each accessed MR and the macro base station and a channel capacity between a to-be-accessed base station and each accessed MR.

However, the to-be-accessed MR uses only the hop count between the accessed MR and the macro base station and the channel capacity between the to-be-accessed base station and each accessed MR, and because the hop count between the accessed MR and the macro base station and the channel capacity between the to-be-accessed base station and each accessed MR cannot represent a real backhaul capability of the accessed MR, a case in which a selected upstream MR cannot meet a backhaul requirement for the to-be-accessed MR may occur.

SUMMARY

The present invention provides a wireless backhaul connection establishment method and apparatus, to resolve a problem that a wireless backhaul capability of a selected upstream mobile relay cannot meet a wireless backhaul requirement.

To achieve the foregoing objective, the present invention uses the following technical solutions:

According to a first aspect, the present invention provides a wireless backhaul connection establishment method, where the method is applied to a wireless backhaul network, the wireless backhaul network includes a gateway and a base station that can communicate with the gateway by using a wireless backhaul connection, the base station includes a base station that can provide a wireless backhaul relay service, and the method includes:

obtaining, by a first base station, a valid backhaul capability of a neighboring base station, where the neighboring base station is a base station that can perform wireless communication with the first base station, and the valid backhaul capability reflects a maximum capability of a base station to serve a newly-added backhaul service;

selecting, by the first base station, an upstream base station from the neighboring base station according to the valid backhaul capability of the neighboring base station and a backhaul service requirement for the first base station, where the upstream base station is configured to provide a wireless backhaul relay service for the first base station; and establishing, by the first base station, a wireless backhaul connection with the upstream base station.

In a first possible implementation, with reference to the first aspect, the valid backhaul capability of the neighboring base station includes at least one of the following parameters: a valid backhaul capacity of the neighboring base station, a hop count and an average delay from the neighboring base station to a gateway, path reliability between the neighboring base station and the gateway, a quantity of valid radio frequency channels, or a quantity of valid carriers;

the valid backhaul capacity is a remaining idle capacity after a total capacity from the neighboring base station to the gateway is occupied by a current backhaul service;

the hop count from the neighboring base station to the gateway is a quantity of base stations included in the path between the neighboring base station and the gateway, and the average delay is an average value of delays when the neighboring base station transmits backhaul data to the gateway by using different wireless backhaul paths;

the path reliability between the neighboring base station and the gateway is a percentage of normal working time of the path in total working time;

the quantity of valid radio frequency channels is a quantity of available idle radio frequency channels of the neighboring base station; and the quantity of valid carriers is a quantity of spectrums that can be used by the neighboring base station to perform wireless transmission.

In a second possible implementation, with reference to the first aspect or the first possible implementation of the first aspect, the obtaining, by a first base station, a valid backhaul capability of a neighboring base station includes:

receiving, by the first base station, a broadcast message of the neighboring base station, where the broadcast message includes the valid backhaul capability of the neighboring base station; or sending, by the first base station, a request message to the neighboring base station, where the request message indicates a request for the valid backhaul capability of the neighboring base station; and receiving, by the first base station, a request response of the neighboring base station, where the request response includes the valid backhaul capability of the neighboring base station.

In a third possible implementation, with reference to the first aspect, the selecting, by the first base station, an upstream base station from the neighboring base station according to the valid backhaul capability of the neighboring base station includes:

S1. forming, by the first base station according to the valid backhaul capability of the neighboring base station, a first set comprising a neighboring base station that meets a first performance indicator, where the first performance indicator includes at least one parameter of the valid backhaul capability;

S2. when the first base station determines that the first set is not empty, transferring a neighboring base station in the first set that has an optimal second performance indicator from the first set to an upstream base station set, where the second performance indicator includes at least one parameter of the valid backhaul capability;

S3. determining, by the first base station, whether a sum of valid backhaul capacities of neighboring base stations in the upstream base station set is greater than or equal to a backhaul capacity required by the first base station;

S4. if it is determined that the sum of valid backhaul capacities of neighboring base stations in the upstream base station set is greater than or equal to a backhaul capacity required by the first base station, determining, by the first base station, all neighboring base stations in the upstream base station set as upstream base stations; and S5. if it is determined that the sum of valid backhaul capacities of neighboring base stations in the upstream base station set is not greater than or equal to a backhaul capacity required by the first base station, cyclically performing steps S2 and S3; and when the first base station determines that the sum of the valid backhaul capacities of the neighboring base stations in the upstream base station set is greater than or equal to the backhaul capacity required by the first base station, determining all neighboring base stations in the upstream base station set as upstream base stations; or when the first set is empty and the sum of the valid backhaul capacities of the neighboring base stations in the upstream base station set is still less than the backhaul capacity required by the first base station, determining all neighboring base stations in the upstream base station set as upstream base stations, where the parameter included in the first performance indicator and the parameter included in the second performance indicator are different.

In a fourth possible implementation, with reference to any one of the first aspect or the foregoing possible implementations of the first aspect, the first base station includes an accessed base station and an unaccessed base station, the accessed base station is a base station that has accessed a wireless backhaul network, and the unaccessed base station is a base station that prepares to access the wireless backhaul network.

In a fifth possible implementation, with reference to the fourth possible implementation of the first aspect, when the first base station is the accessed base station, before the selecting, by the first base station, an upstream base station from the neighboring base station according to the valid backhaul capability of the neighboring base station and a backhaul service requirement for the first base station, the method further includes:

determining, by the accessed base station according to a valid backhaul capability of a current upstream base station and a backhaul service requirement for the accessed base station, whether an upstream base station needs to be reselected.

In a sixth possible implementation, with reference to the fifth possible implementation of the first aspect, when the first base station is the accessed base station, after the selecting, by the first base station, an upstream base station from the neighboring base station according to the valid backhaul capability of the neighboring base station, the method further includes:

updating, by the accessed base station, a valid backhaul capability of the accessed base station according to the valid backhaul capability of the current upstream base station of the accessed base station and the backhaul service requirement for the accessed base station.

According to a second aspect, the present invention provides a wireless backhaul connection establishment apparatus, where the apparatus is a first base station or is integrated into the first base station, and the apparatus includes:

an obtaining unit, configured to obtain a valid backhaul capability of a neighboring base station, where the neighboring base station is a base station that can perform wireless communication with the first base station, and the valid backhaul capability reflects a maximum capability of a base station to serve a newly-added backhaul service;

a selection unit, configured to select an upstream base station from the neighboring base station according to the valid backhaul capability of the neighboring base station and a backhaul service requirement for the first base station, where the upstream base station is configured to provide a wireless backhaul relay service for the first base station; and an establishment unit, configured to establish a wireless backhaul connection with the upstream base station selected by the selection unit.

In a first possible implementation, with reference to the second aspect, the valid backhaul capability of the neighboring base station includes at least one of the following parameters: a valid backhaul capacity of the neighboring base station, a hop count and an average delay from the neighboring base station to a gateway, path reliability between the neighboring base station and the gateway, a quantity of valid radio frequency channels, or a quantity of valid carriers;

the valid backhaul capacity is a remaining idle capacity after a total capacity from the neighboring base station to the gateway is occupied by a current backhaul service;

the hop count from the neighboring base station to the gateway is a quantity of base stations included in the path between the neighboring base station and the gateway, and the average delay is an average value of delays when the neighboring base station transmits backhaul data to the gateway by using different wireless backhaul paths;

the path reliability between the neighboring base station and the gateway is a percentage of normal working time of the path in total working time;

the quantity of valid radio frequency channels is a quantity of available idle radio frequency channels of the neighboring base station; and the quantity of valid carriers is a quantity of spectrums that can be used by the neighboring base station to perform wireless transmission.

In a second possible implementation, with reference to the second aspect or the first possible implementation of the second aspect, the obtaining unit is further configured to receive a broadcast message of the neighboring base station, where the broadcast message includes the valid backhaul capability of the neighboring base station; or the obtaining unit is further configured to: send a request message to the neighboring base station, where the request message indicates a request for the valid backhaul capability of the neighboring base station; and receive a request response of the neighboring base station, where the request response includes the valid backhaul capability of the neighboring base station.

In a third possible implementation, with reference to the second aspect, the selection unit includes a formation module, a transfer module, and a determining module;

the formation module is configured to form, according to the valid backhaul capability of the neighboring base station, a first set comprising a neighboring base station that meets a first performance indicator, where the first performance indicator includes at least one parameter of the valid backhaul capability;

the transfer module is configured to: when that the first set is not empty, transfer a neighboring base station that has an optimal second performance indicator and that is in the first set from the first set to an upstream base station set, where the second performance indicator includes at least one parameter of the valid backhaul capability;

the determining module is configured to: when a sum of valid backhaul capacities of neighboring base stations in the upstream base station set is greater than or equal to a backhaul capacity required by the first base station, determine all neighboring base stations in the upstream base station set as upstream base stations; and the determining module is further configured to: when the first set is empty and the sum of the valid backhaul capacities of the neighboring base stations in the upstream base station set is still less than the backhaul capacity required by the first base station, determine all neighboring base stations in the upstream base station set as upstream base stations, where the parameter included in the first performance indicator and the parameter included in the second performance indicator are different.

In a fourth possible implementation, with reference to the third possible implementation of the second aspect, the apparatus further includes:

a judgment unit, configured to determine, according to a valid backhaul capability of a current upstream base station and a backhaul service requirement for an accessed base station, whether an upstream base station needs to be reselected.

In a fifth possible implementation, with reference to the fourth possible implementation of the second aspect, the apparatus further includes:

an updating unit, configured to update a valid backhaul capability of the accessed base station according to the valid backhaul capability of the current upstream base station of the accessed base station and the backhaul service requirement for the accessed base station.

According to a third aspect, the present invention further provides a wireless backhaul connection establishment apparatus, where the apparatus is a first base station or is integrated into the first base station, and the apparatus includes:

a memory, configured to store information including a program instruction;

a receiver, configured to obtain a valid backhaul capability of a neighboring base station, where the neighboring base station is a base station that can perform wireless communication with the first base station, and the valid backhaul capability reflects a maximum capability of a base station to serve a newly-added backhaul service; and a processor, coupled with the memory and the receiver, configured to control execution of the program instruction, and specifically configured to: select an upstream base station from the the neighboring base station according to the valid backhaul capability of the neighboring base station and a backhaul service requirement for the first base station, where the upstream base station is configured to provide a wireless backhaul relay service for the first base station; and establish a wireless backhaul connection with the upstream base station.

In a first possible implementation, with reference to the third aspect, the valid backhaul capability of the neighboring base station includes at least one of the following parameters: a valid backhaul capacity of the neighboring base station, a hop count and an average delay from the neighboring base station to a gateway, path reliability between the neighboring base station and the gateway, a quantity of valid radio frequency channels, or a quantity of valid carriers;

the valid backhaul capacity is a remaining idle capacity after a total capacity from the neighboring base station to the gateway is occupied by a current backhaul service;

the hop count from the neighboring base station to the gateway is a quantity of base stations included in the path between the neighboring base station and the gateway, and the average delay is an average value of delays when the neighboring base station transmits backhaul data to the gateway by using different wireless backhaul paths;

the path reliability between the neighboring base station and the gateway is a percentage of normal working time of the path in total working time;

the quantity of valid radio frequency channels is a quantity of available idle radio frequency channels of the neighboring base station; and the quantity of valid carriers is a quantity of spectrums that can be used by the neighboring base station to perform wireless transmission.

In a second possible implementation, with reference to the third aspect or the first possible implementation of the third aspect, the apparatus further includes a transmitter;

the receiver is further configured to receive a broadcast message of the neighboring base station, where the broadcast message includes the valid backhaul capability of the neighboring base station; or the transmitter is further configured to: send a request message to the neighboring base station, where the request message indicates a request for the valid backhaul capability of the neighboring base station; and receive a request response of the neighboring base station, where the request response includes the valid backhaul capability of the neighboring base station.

In a third possible implementation, with reference to the third aspect, the processor is further coupled with the transmitter, and is configured to: form, according to the valid backhaul capability of the neighboring base station, a first set comprising a neighboring base station that meets a first performance indicator, where the first performance indicator includes at least one parameter of the valid backhaul capability; when that the first set is not empty, transfer a neighboring base station that has an optimal second performance indicator and that is in the first set from the first set to an upstream base station set, where the second performance indicator includes at least one parameter of the valid backhaul capability; when a sum of valid backhaul capacities of neighboring base stations in the upstream base station set is greater than or equal to a backhaul capacity required by the first base station, determine all neighboring base stations in the upstream base station set as upstream base stations; or when the first set is empty and the sum of the valid backhaul capacities of the neighboring base stations in the upstream base station set is still less than the backhaul capacity required by the first base station, determine all neighboring base stations in the upstream base station set as upstream base stations, where the parameter included in the first performance indicator and the parameter included in the second performance indicator are different.

In a fourth possible implementation, with reference to the third possible implementation of the third aspect, the processor is further configured to determine, according to a valid backhaul capability of a current upstream base station and a backhaul service requirement for an accessed base station, whether an upstream base station needs to be reselected.

In a fifth possible implementation, with reference to the fourth possible implementation of the third aspect, the processor is further configured to update a valid backhaul capability of the accessed base station according to the valid backhaul capability of the current upstream base station and the backhaul service requirement for the accessed base station.

According to the wireless backhaul connection establishment method and apparatus provided in the present invention, compared with that in the prior art, a first base station can obtain a valid backhaul capability of a neighboring base station, and can select, according to the valid backhaul capability of the neighboring base station and a backhaul service requirement for the first base station, a neighboring base station that can really meet the backhaul service requirement for the first base station as an upstream base station.

BRIEF DESCRIPTION OF DRAWINGS

FIG. 1 is an example schematic diagram of a wireless backhaul network according to an embodiment of the present invention;

FIG. 2 is a flowchart of a wireless backhaul connection establishment method according to an embodiment of the present invention;

DESCRIPTION OF EMBODIMENTS

Figure 3:
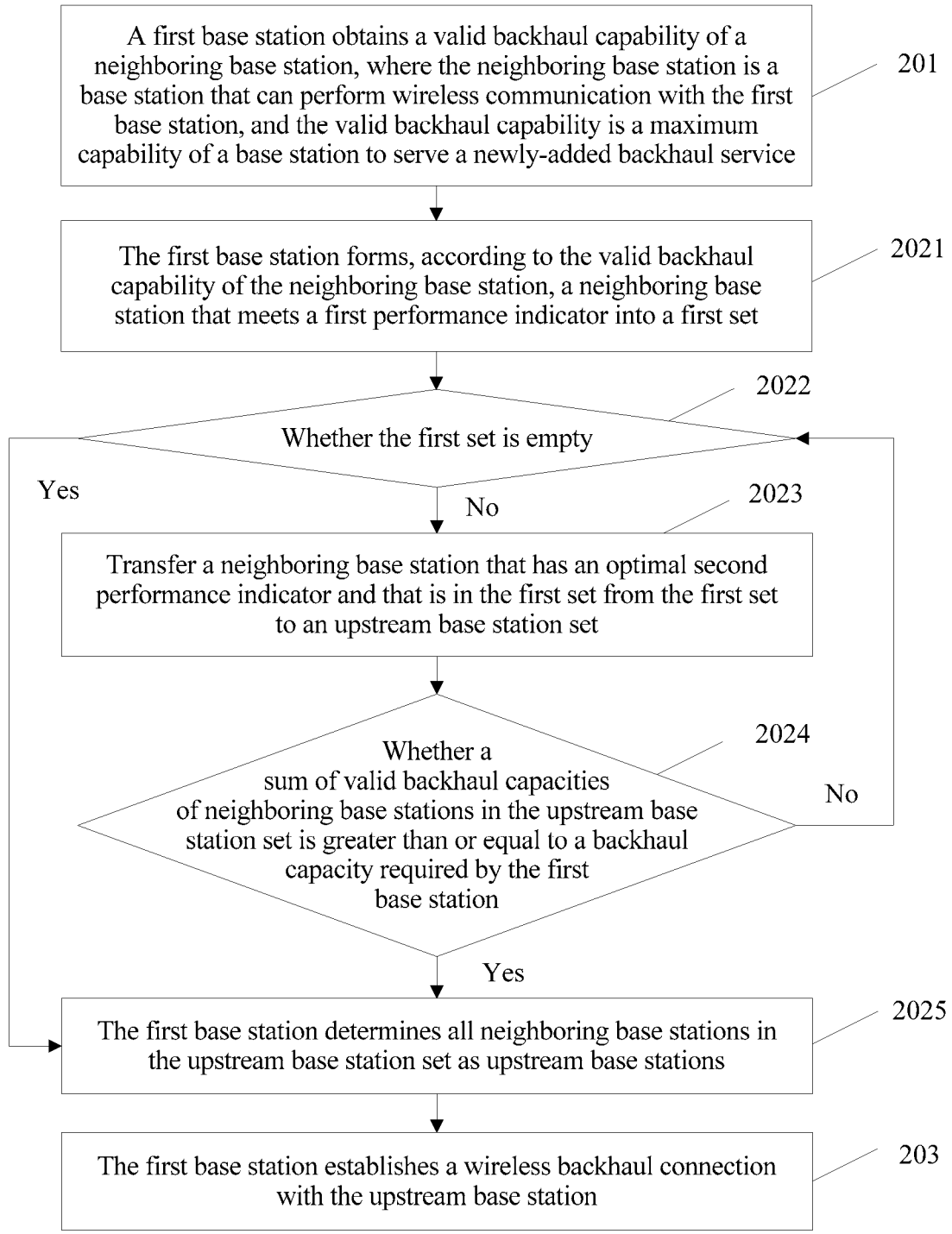
FIG. 3 is a flowchart of another wireless backhaul connection establishment method according to an embodiment of the present invention.

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without undue experiments shall fall within the protection scope of the present invention.

The wireless backhaul connection establishment method provided in the embodiments of the present invention is applicable to a wireless backhaul network. The wireless backhaul network may be a UDN network, at least a gateway and a base station that can communicate with the gateway by using a wireless backhaul connection are disposed in the wireless backhaul network, and the wireless backhaul network includes a base station that can provide a wireless backhaul relay service. The base station in the wireless backhaul network may forward backhaul data to the gateway by using the base station that has a wireless backhaul relay function, thereby completing data transmission between the base station and a core network.

In the wireless backhaul network, one base station has at least one backhaul path, each backhaul path includes the base station and a point-to-point link between base stations, and two endpoints of the backhaul path are a base station and a gateway respectively. For example, as shown in FIG. 1, FIG. 1 is an example schematic diagram of a wireless backhaul network, and only two wireless backhaul paths are shown. There are wireless connections between a gateway and a base station A, between the base station And a base station B, and between the base station B and a base station C. The gateway, the base station A, the base station B, and the base station C form a backhaul path. The base station A is an upstream base station of the base station B, and the base station B is an upstream base station of the base station C. In addition, in FIG. 1, the gateway, the base station A, the base station B, and a base station D form another backhaul path.

It should be noted that one base station may be connected to multiple upstream base stations. Therefore, one base station may be located in multiple backhaul paths, and the multiple upstream base stations connected to the base station may jointly provide a wireless backhaul relay service for the base station.

Based on the foregoing wireless backhaul network, an embodiment of the present invention provides a wireless backhaul connection establishment method, which is applicable to a process of establishing a wireless backhaul connection by a first base station with an upstream base station in the wireless backhaul network, so that a wireless backhaul capability of the selected upstream base station can meet a wireless backhaul requirement for the first base station. As shown in FIG. 2, the method includes the following steps.

201. A first base station obtains a valid backhaul capability of a neighboring base station, where the neighboring base station is a base station that can perform wireless communication with the first base station, and the valid backhaul capability reflects a maximum capability of a base station to serve a newly-added backhaul service.

The first base station is a base station that needs to select an upstream base station. The first base station includes an accessed base station and an unaccessed base station, the accessed base station is a base station that has accessed a wireless backhaul network, and the unaccessed base station is a base station that has not accessed the wireless backhaul network.

In this embodiment of the present invention, the upstream base station is a base station that has a wireless backhaul capability. The first base station may be a base station that has the wireless backhaul capability, or may be a base station that does not have the wireless backhaul capability. To improve performance of the wireless backhaul network, all base stations in the wireless backhaul network may be disposed as base stations that have the wireless backhaul capability.

The neighboring base station is a base station that has accessed the wireless backhaul network. In the wireless backhaul network, the accessed base station can send a broadcast message, and a base station to which the broadcast message that can be received by the unaccessed base station belongs is a neighboring base station of the unaccessed base station, that is, there may be one or more neighboring base stations, and the neighboring base station is a base station that has the wireless backhaul capability.

It should be noted that the valid backhaul capability of the neighboring base station includes at least one of the following parameters: a valid backhaul capacity of the neighboring base station, a hop count to a gateway and an average delay, path reliability between the neighboring base station and the gateway, a quantity of valid radio frequency channels of the neighboring base station, or a quantity of valid carriers. The valid backhaul capability may be one of the parameters or a combination of several parameters.

The valid backhaul capacity is a remaining idle capacity after a total capacity from the neighboring base station to the gateway is occupied by a current backhaul service of the neighboring base station. A neighboring base station i of the first base station has L wireless backhaul paths, where L is an integer greater than or equal to 1. The valid backhaul capacity may be expressed as:

$$BH\_Cap_{i,tot} = \sum_{l \in L} BH\_Cap_{i,l},$$

where $BH\_Cap_{i,l}$ is a valid backhaul capacity of the base station i on a path 1; and $BH\_Cap_{i,l}=bh\_link\_cap_{i,i_l}-load_{i,l}$, where $load_{i,l}$ represents a backhaul capacity occupied by the base station i on the path 1, $bh\_link\_cap_{i,i_l}$ represents a maximum backhaul capacity between the base station i and an upstream base station $i_l$ on the path 1, $bh\_link\_cap_{i,i_l}=min$ $(link\_cap_{i,i_l}, BH\_Cap_{i_l,tot})$, $link\_cap_{i,i_l}$ represents a wireless link capacity between the base station i and the upstream base station $i_l$ on the path 1, and $BH\_Cap_{i_l,tot}$ is a valid backhaul capacity of the base station $i_l$.

It should be noted that when the neighboring base station has multiple backhaul paths, the valid backhaul capacity of the neighboring base station may be expressed as a sum of valid backhaul capacities of all paths of the neighboring base station, or may be expressed as a list of valid backhaul capacities of all paths.

The hop count to a gateway is a quantity of base stations included in the path between the neighboring base station and the gateway, a delay to a gateway is a delay when the neighboring base station transmits backhaul data to the gateway by using the wireless backhaul path, and the average delay to the gateway is an average value of delays when the neighboring base station transmits the backhaul data to the gateway by using different wireless backhaul paths.

The path reliability between the neighboring base station and the gateway represents a stability degree when the path works, and is specifically expressed as a percentage of normal working time of the path in total working time.

The radio frequency channel is a physical bearer for wireless transmission, and the quantity of valid radio frequency channels of the neighboring base station is a quantity of available idle radio frequency channels of the neighboring base station. In the wireless backhaul network, one base station may simultaneously serve multiple downstream base stations, and the base station may determine the quantity of valid radio frequency channels according to a usage policy of the base station on the radio frequency channel and a quantity of currently served downstream base stations. The usage policy of the base station on the radio frequency channel may be that a single radio frequency channel serves a single user or a single radio frequency channel serves multiple users. The quantity of valid radio frequency channels may be used as a basis for the first base station to select the upstream base station. For example, when a quantity of valid radio frequency channels of a neighboring base station is zero, it indicates that the neighboring base station cannot serve a new downstream base station any longer, and the first base station does not select the neighboring base station as the upstream base station of the first base station.

The quantity of valid carriers is a quantity of spectrums that can be used by the neighboring base station to perform wireless transmission. The base station may determine the quantity of valid carriers according to a usage policy of the base station on the spectrum and a quantity of currently served downstream base stations. The usage policy of the base station on the spectrum may be that a single carrier serves a single user or a single carrier serves multiple users. The quantity of carriers is also used as the basis for the first base station to select the upstream base station. When a quantity of valid carriers of a neighboring base station is zero, it indicates that the neighboring base station cannot serve a new downstream base station any longer, and the first base station does not select the neighboring base station as the upstream base station of the first base station.

Further, it may be understood that the valid backhaul capability of the base station is a difference between a maximum backhaul capability of the base station and a backhaul capability used by the base station to serve a currently accessed downstream base station, that is, a remaining backhaul capability of the base station. For example, with reference to FIG. 1, it is assumed that the base station B currently has only two downstream base stations: the base station C and the base station D. When the base station B is not connected to the base station C and the base station D, a valid backhaul capability of the base station B is a maximum backhaul capability of the base station B (for example, when the valid backhaul capability is the valid backhaul capacity, the maximum backhaul capability of the base station B is a total capacity from the base station B to the gateway). After the base station B is connected to the base station C and the base station D, the valid backhaul capability of the base station B=the maximum backhaul capability of the base station B−a backhaul capability used by the base station B to serve the base station C—a backhaul capability used by the base station B to serve the base station D.

202. The first base station selects an upstream base station from the neighboring base station according to the valid backhaul capability of the neighboring base station and a backhaul service requirement for the first base station, where the upstream base station is configured to provide a wireless backhaul relay service for the first base station.

It may be understood that the neighboring base station can be used as the upstream base station of the first base station only when the valid backhaul capability of the neighboring base station can meet the backhaul service requirement for the first base station.

203. The first base station establishes a wireless backhaul connection with the upstream base station.

To establish a backhaul path with the selected upstream base station, the first base station needs to establish the wireless backhaul connection with the selected upstream base station. A process of establishing the wireless backhaul connection is: the upstream base station first performs authentication on the first base station; after the authentication succeeds, the upstream base station performs backhaul capability negotiation with the first base station; then the first base station performs wireless backhaul connection registration on the upstream base station; after the registration succeeds, the wireless backhaul connection between the first base station and the upstream base station is established; and after the wireless backhaul connection is established, the first base station is a downstream base station of the upstream base station.

According to the wireless backhaul connection establishment method provided in this embodiment of the present invention, a first base station obtains a valid backhaul capability of a neighboring base station, and selects an upstream base station from the neighboring base station according to the valid backhaul capability of the neighboring base station and a backhaul service requirement for the first base station, and the first base station establishes a wireless backhaul connection with the upstream base station. Compared with the prior art that a selected upstream base station cannot meet a backhaul requirement for a to-be-accessed MR because a channel capacity between a to-be-accessed base station and each accessed MR cannot represent a real backhaul capability of the accessed MR, in this embodiment of the present invention, the first base station can obtain the valid backhaul capability of the neighboring base station. Because the valid backhaul capability can represent a real maximum capability of a base station to serve a newly-added backhaul service, the neighboring base station that can meet the backhaul service requirement for the first base station can be selected as the upstream base station according to the valid backhaul capability of the neighboring base station and the backhaul service requirement for the first base station, and a case in which the selected upstream base station cannot meet the backhaul service requirement for the first base station does not occur.

It should be noted that in a process of obtaining the neighboring base station by the first base station, the neighboring base station can communicate with the first base station in a broadcast manner, and can further communicate with the first base station in a unicast manner. Therefore, the foregoing step 201 in which a first base station obtains a valid backhaul capability of a neighboring base station may specifically include the following two implementations:

A first implementation is: the first base station receives a broadcast message of the neighboring base station, where the broadcast message includes the valid backhaul capability of the neighboring base station.

A second implementation is: the first base station sends a request message to the neighboring base station, where the request message indicates a request for the valid backhaul capability of the neighboring base station; and then the first base station receives a request response of the neighboring base station, where the request response includes the valid backhaul capability of the neighboring base station.

To better ensure the performance of the wireless backhaul network, when selecting the upstream base station, the first base station needs to not only select a base station that meets the backhaul service requirement for the first base station as the upstream base station, but also minimize a quantity of upstream base stations of this station, so that wireless backhaul data can be transmitted to the gateway faster. Therefore, in another implementation provided in this embodiment of the present invention, that the first base station selects an upstream base station from the neighboring base station according to the valid backhaul capability of the neighboring base station and a backhaul service requirement for the first base station may be specifically implemented in the following steps.

S1. The first base station forms, according to the valid backhaul capability of the neighboring base station, a first set comprising a neighboring base station that meets a first performance indicator, where the first performance indicator includes at least one parameter of the valid backhaul capability.

S2. When the first base station determines that the first set is not empty, transfer a neighboring base station that has an optimal second performance indicator and that is in the first set from the first set to an upstream base station set, where the second performance indicator includes at least one parameter of the valid backhaul capability.

The parameter included in the first performance indicator and the parameter included in the second performance indicator are different. Both the first performance indicator and the second performance indicator may include one parameter or a combination of several parameters.

For example, when the first performance indicator is the a hop count to a gateway or the average delay, the second performance indicator is the valid backhaul capacity. When the first performance indicator is the valid backhaul capacity, the second performance indicator is the a hop count to a gateway or the average delay.

S3. The first base station determines whether a sum of valid backhaul capacities of neighboring base stations in the upstream base station set is greater than or equal to a backhaul capacity required by the first base station.

S4. If it is determined that the sum of valid backhaul capacities of neighboring base stations in the upstream base station set is greater than or equal to a backhaul capacity required by the first base station, the first base station determines the neighboring base station in the upstream base station set as the upstream base station.

S5. If it is determined that the sum of valid backhaul capacities of neighboring base stations in the upstream base station set is not greater than or equal to a backhaul capacity required by the first base station, cyclically perform steps S2 and S3; and when the first base station determines that the sum of the valid backhaul capacities of the neighboring base stations in the upstream base station set is greater than or equal to the backhaul capacity required by the first base station, determine all neighboring base stations in the upstream base station set as upstream base stations; or when the first set is empty and the sum of the valid backhaul capacities of the neighboring base stations in the upstream base station set is still less than the backhaul capacity required by the first base station, determine all neighboring base stations in the upstream base station set as upstream base stations.

Descriptions are provided with reference to FIG. 2. Specifically, as shown in FIG. 3, the foregoing step 202 in which the first base station selects an upstream base station from the neighboring base station according to the valid backhaul capability of the neighboring base station and a backhaul service requirement for the first base station may be specifically implemented in steps 2021 to 2025.

2021. The first base station forms, according to the valid backhaul capability of the neighboring base station, a first set comprising a neighboring base station that meets a first performance indicator.

The first performance indicator includes at least one parameter of the valid backhaul capability.

It should be noted that in an implementation, for a service that is relatively sensitive to the delay, the first performance indicator may include the a hop count to a gateway or the average delay, and the a hop count to a gateway may reflect the delay for transmitting the backhaul data to the gateway. In brief, time required for transmitting the backhaul data to the gateway through one base station is shorter than that for transmitting the backhaul data to the gateway through ten base stations. Therefore, that the first base station selects a neighboring base station having a small a hop count to a gateway as the upstream base station is more conducive to the performance of the wireless backhaul network.

Each first base station has a maximum hop count limit value. When a hop count to a gateway of the first base station exceeds the maximum hop count limit value, it takes quite long time to transmit the backhaul data from the first base station to the gateway, and the performance of the wireless backhaul network is affected. Therefore, after the first base station obtains valid backhaul capabilities of multiple neighboring base stations, the a hop count to a gateway of each neighboring base station is compared with the maximum hop count limit value of the first base station, so as to screen a neighboring base station whose a hop count to a gateway is less than the maximum hop count limit value to form the first set, or the average delay of each neighboring base station is compared with a maximum delay limit value, so as to screen a neighboring base station whose average delay is less than the maximum delay limit value to form the first set.

For a service that is insensitive to the delay, the first performance indicator is determined as the valid backhaul capacity, a neighboring base station whose valid backhaul capacity is greater than a preset value is screened, and the neighboring base station forms the first set.

2022. The first base station determines whether the first set is empty. If the first set is empty, perform the following step 2025; or if the first set is not empty, perform the following step 2023.

It should be noted that the first performance indicator is set according to an empirical value, and a purpose for setting the first performance indicator is selecting a neighboring base station with a relatively strong valid backhaul capability; therefore, generally, the first set is not empty at first determining.

2023. Transfer a neighboring base station that has an optimal second performance indicator and that is in the first set from the first set to an upstream base station set.

It should be noted that when the first set is not empty, it indicates that there is a neighboring base station that meets the first performance indicator, and therefore the neighboring base station that has the optimal second performance indicator may be transferred to the upstream base station set so as to be used as an alternative upstream base station of the first base station.

The second performance indicator includes at least one parameter of the valid backhaul capability, and parameters included in the first performance indicator and included in the second performance indicator are different.

When the first performance indicator is the a hop count to a gateway or the average delay, the second performance indicator is the valid backhaul capacity. When the first performance indicator is the valid backhaul capacity, the second performance indicator is the a hop count to a gateway or the average delay.

Specifically, an example in which the first performance indicator is the a hop count to a gateway and the second performance indicator is the valid backhaul capacity is used for description. After the neighboring base station whose a hop count to a gateway is less than the maximum hop count limit value is selected and the neighboring base station forms the first set, a neighboring base station with a maximum valid backhaul capacity in the first set is transferred to the upstream base station set. To select the upstream base station from the first set conveniently, the neighboring base stations in the first set are arranged in descending order of the valid backhaul capacity, so that a neighboring base station with a large valid backhaul capacity is first selected.

It should further be noted that the first performance indicator and the second performance indicator are not limited to several performance indicators described above. According to a characteristic of the wireless backhaul network and an actual requirement, another network performance indicator may be used as the first performance indicator or the second performance indicator, or a combination of several parameters of the valid backhaul capability is used as the second performance indicator.

2024. The first base station determines whether a sum of valid backhaul capacities of neighboring base stations in the upstream base station set is greater than or equal to a backhaul capacity required by the first base station. If it is determined that the sum of valid backhaul capacities of neighboring base stations in the upstream base station set is greater than or equal to a backhaul capacity required by the first base station, perform step 2025; or if it is determined that the sum of valid backhaul capacities of neighboring base stations in the upstream base station set is not greater than or equal to a backhaul capacity required by the first base station, perform step 2022.

2025. The first base station determines all neighboring base stations in the upstream base station set as upstream base stations.

It should be noted that after the neighboring base station in the first set is transferred to the upstream base station set, a quantity of neighboring base stations in the first set decreases. Therefore, after all the neighboring base stations in the first set are transferred to the upstream base station set, that is, when the first set is empty, though the sum of the valid backhaul capacities of the neighboring base stations in the current upstream base station set still cannot meet the backhaul capacity required by the first base station, no neighboring base station beyond the upstream base station set can be used as the alternative upstream base station of the first base station at this time. Therefore, the neighboring base station in the upstream base station set at this time is also used as the upstream base station of the first base station, and when there is a neighboring base station that meets a condition, an upstream base station is added to the first base station.

It should further be noted that if the valid backhaul capability of the neighboring base station is large enough, the upstream base station set may have only one neighboring base station, or the upstream base station set includes multiple neighboring base stations, and all the multiple neighboring base stations are used as the upstream base stations of the first base station to backhaul data for the first base station. Therefore, the first base station may establish the wireless backhaul connection with one neighboring base station, or may establish the wireless backhaul connection with the multiple neighboring base stations.

According to the wireless backhaul connection establishment method provided in this embodiment of the present invention, a first base station selects, from a neighboring base station that meets a first performance indicator, a neighboring base station that has an optimal second performance indicator as an upstream base station, so that backhaul data of the first base station is transmitted to a gateway through as few base stations as possible. A transmission delay is decreased, a backhaul capacity requirement for the first base station is met, and performance of a wireless backhaul network is improved. In addition, an MR in the prior art can be used only as a mobile relay to help a wireless backhaul base station to backhaul data but cannot carry a service. In the wireless backhaul network in this embodiment of the present invention, a base station not only is used as a mobile relay to help a downstream base station to backhaul data, but also can carry a service. An MR is not used, a network structure is simplified, channel overheads are saved, and the performance of the wireless backhaul network is improved.

To flexibly manage a backhaul topology in the wireless backhaul network, each base station that uses wireless backhaul needs to obtain a valid backhaul capability of a surrounding neighboring base station. The first base station in the foregoing embodiment includes an accessed base station and an unaccessed base station. The accessed base station is a base station that has accessed the wireless backhaul network, and the unaccessed base station is a base station that prepares to access the wireless backhaul network. Obtaining the valid backhaul capability of the neighboring base station by the accessed base station is to determine whether a current upstream base station can meet a wireless backhaul service requirement for the accessed base station, so as to select a proper upstream base station and update a valid backhaul capability of the accessed base station. Obtaining the valid backhaul capability of the neighboring base station by the unaccessed base station is to select, according to the valid backhaul capability of the neighboring base station, the proper upstream base station to access the wireless backhaul network.

Figure 4:
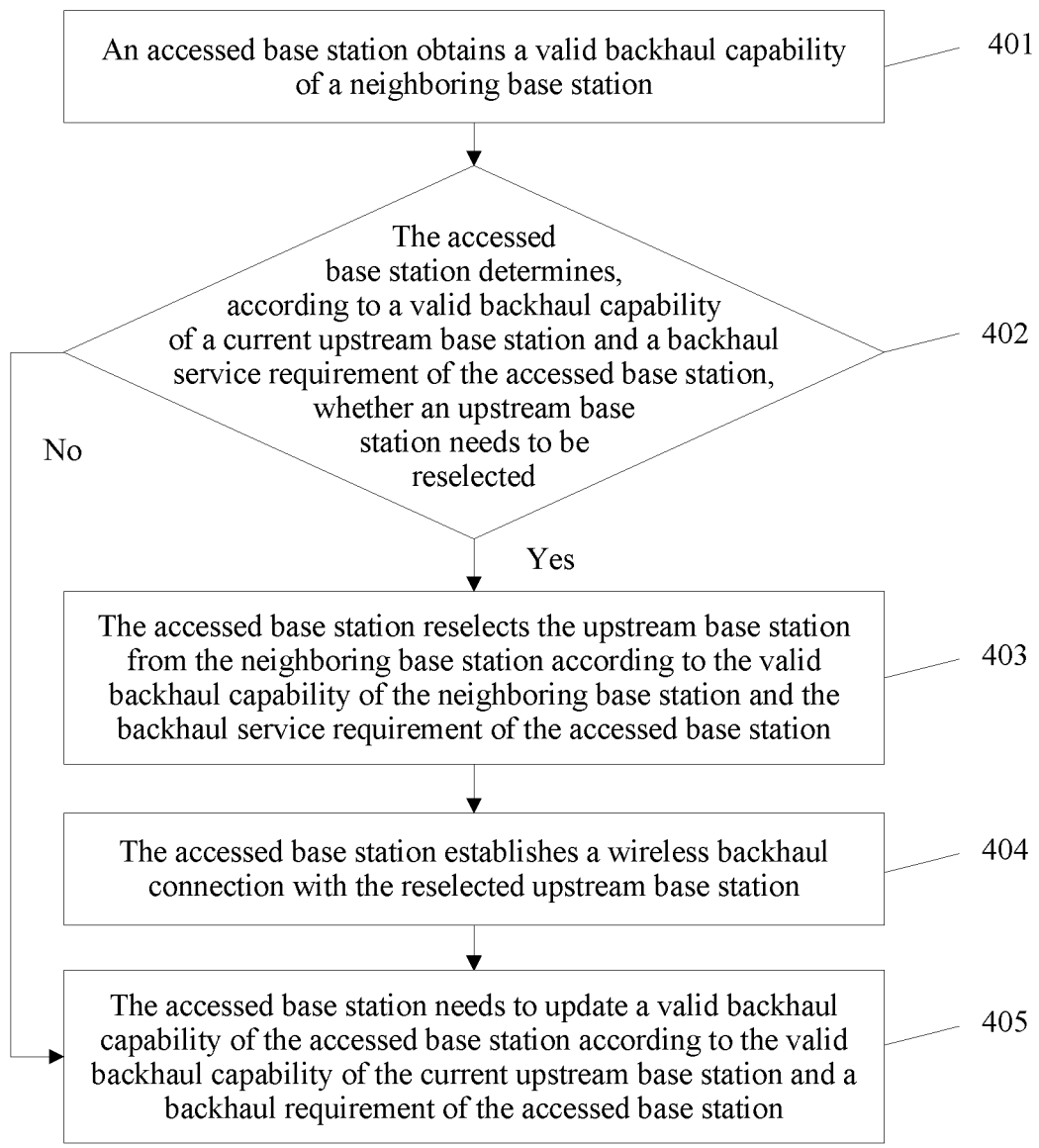
FIG. 4 is a flowchart of another wireless backhaul connection establishment method according to an embodiment of the present invention.

When the first base station in the foregoing embodiment is the accessed base station, because the accessed base station has an upstream base station, before an upstream base station is reselected, it needs to be determined whether a new upstream base station needs to be selected, and the accessed base station needs to update the valid backhaul capability of the accessed base station according to the valid backhaul capability of the neighboring base station. Therefore, as shown in FIG. 4, in another embodiment of the present invention, when a first base station is an accessed base station, the wireless backhaul connection establishment method provided in this embodiment of the present invention includes the following steps.

401. An accessed base station obtains a valid backhaul capability of a neighboring base station.

402. The accessed base station determines, according to a valid backhaul capability of a current upstream base station and a backhaul service requirement for the accessed base station, whether an upstream base station needs to be reselected.

When the valid backhaul capability of the current upstream base station cannot meet the backhaul service requirement for the accessed base station, the following steps 403 to 405 are performed; or when the valid backhaul capability of the current upstream base station can meet the backhaul service requirement for the accessed base station, the accessed base station does not need to reselect the upstream base station, and the following step 405 is directly performed.

403. The accessed base station reselects the upstream base station from the neighboring base station according to the valid backhaul capability of the neighboring base station and the backhaul service requirement for the accessed base station.

404. The accessed base station establishes a wireless backhaul connection with the reselected upstream base station.

It should be noted that after the accessed base station reselects the upstream base station, some original upstream base stations may be deleted. The accessed base station needs to disconnect wireless backhaul connections with these base stations. Generally, a disconnection process is: the accessed base station releases an occupied radio resource of a to-be-deleted upstream base station, and the to-be-deleted upstream base station then deregisters a wireless backhaul connection from the accessed base station.

405. The accessed base station needs to update a valid backhaul capability of the accessed base station according to the valid backhaul capability of the current upstream base station and a backhaul requirement for the accessed base station.

According to the wireless backhaul connection establishment method provided in this embodiment of the present invention, when a first base station is an accessed base station, the accessed base station determines, according to a valid backhaul capability of a current upstream base station and a backhaul service requirement for the accessed base station, whether an upstream base station needs to be reselected. When the valid backhaul capability of the current upstream base station cannot meet the backhaul service requirement for the accessed base station, the upstream base station is reselected, so as to effectively ensure that backhaul data of the accessed base station can be backhauled to a gateway in a timely manner, thereby improving performance of a wireless backhaul network.

Figure 5:
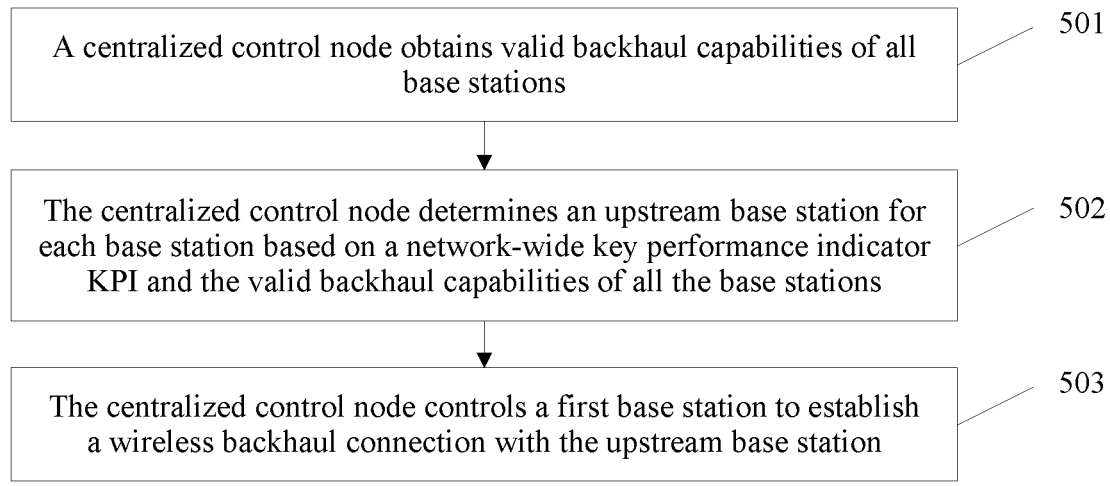
FIG. 5 is a flowchart of another wireless backhaul connection establishment method according to an embodiment of the present invention.

All the foregoing embodiments are wireless backhaul connection establishment methods in a wireless backhaul network when distributed management is used. Another embodiment of the present invention further provides a wireless backhaul connection establishment method when centralized management is used. As shown in FIG. 5, the method includes the following steps.

501. A centralized control node obtains valid backhaul capabilities of all base stations.

The centralized control node may receive a valid backhaul capability actively sent by a base station to the centralized control node. Alternatively, the centralized control node sends a request message to the base station, where the request message indicates a request for a valid backhaul capability of a neighboring base station; and then the centralized control node receives a request response of the base station, where the request response includes the valid backhaul capability of the base station.

502. The centralized control node determines an upstream base station for each base station based on a network-wide KPI (Key Performance Indicator, key performance indicator) and the valid backhaul capabilities of all the base stations.

In this embodiment of the present invention, the KPI may be a minimized total quantity of upstream base stations of all the base stations when backhaul requirements of all the base stations are met.

In a wireless backhaul network, the upstream base station may serve multiple downstream base stations, and the multiple downstream base stations share a wireless channel between the downstream base station and the upstream base station. Interference is caused when multiple base stations use a same channel. To reduce mutual interference, generally, a quadrature backhaul channel is used between base stations that are seriously interfered with. However, because a quantity of quadrature channels is usually limited, when there is a relatively large quantity of base stations in the wireless backhaul network, an upstream and downstream relationship between the base stations needs to be planned, and the total quantity of upstream base stations of all the base stations is minimized, so as to decrease a quantity of channels used by each upstream base station, and reduce interference caused by channel conflict.

A selection policy for the upstream base station may be expressed as the following formula:

$$\begin{cases} \min_{a,f} \left( \sum_{i,j \in B} a_{ij} \right), \\ \text{s.t.} \\ \sum_{i \in B} a_{ij} f_{ij} \geq D_j, \forall\ j \in B, \\ \sum_{j \in B} a_{ij} f_{ij} \leq C_i, \forall\ i \in B, \\ a_{ij} \in \{0, 1\}, \\ f_{ij} \geq 0. \end{cases}$$

where B is a base station set; $a_{ij}$ is an upstream base station allocation decision instruction, a value 1 indicates that a base station j is selected as an upstream base station of a base station i, and a value 0 indicates that the base station j is not selected as the upstream base station of the base station i; $f_{ij}$ is a backhaul capacity obtained by the base station j from the base station i; $D_j$ is a total backhaul requirement for the base station j; and $C_i$ is a valid backhaul capability (capacity) of the base station i. The upstream base station of each base station and a backhaul requirement for each upstream base station may be determined according to the formula.

Different methods may be used to solve the foregoing formuland obtain the upstream base station allocation decision instruction $a_{ij}$ of each base station. One method is based on a greedy algorithm (greedy algorithm), and a proper upstream base station is first allocated to an unaccessed base station with a relatively large backhaul service requirement. Specific steps are as follows:

(1). Select an unaccessed base station with a maximum backhaul service requirement as a current base station, and select a neighboring base station that has a maximum valid backhaul capacity from a neighboring base station of the current base station as an upstream base station of the current base station. If a backhaul service requirement for the current base station is met, allocate the upstream base station to the current base station, and repeat this step until upstream base stations are allocated to all base stations. If the backhaul service requirement for the current base station is not met, perform a next step.

(2). Additionally select a neighboring base station that has a second-largest valid backhaul capacity from the neighboring base station of the current base station as the upstream base station of the current base station. If the backhaul service requirement for the current base station is met, allocate the upstream base station to the current base station. If the backhaul service requirement for the current base station is not met, repeat this step until the backhaul service requirement for the current base station is met, or all neighboring base stations are selected as upstream base stations.

It should be noted that the KPI used in this embodiment of the present invention is not limited to the minimized total quantity of upstream base stations, and may also be, for example, a maximized average base station backhaul throughput rate or a minimized base station backhaul hop count.

503. The centralized control node controls a first base station to establish a wireless backhaul connection with the upstream base station.

On the basis of the foregoing step 502 in which the centralized control node has determined the upstream base station for each base station, the first base station may establish the wireless backhaul connection with the upstream base station according to a determining result of the centralized control node.

After the upstream base station is determined, a method in which the first base station establishes the wireless backhaul connection with the upstream base station is the same as related descriptions in the foregoing embodiments, and details are not described herein again.

According to the wireless backhaul connection establishment method provided in this embodiment of the present invention, a centralized control node obtains valid backhaul capabilities of all base stations, and the centralized control node determines an upstream base station for each base station based on a network-wide KPI and the valid backhaul capabilities of all the base stations, so that a first base station establishes a wireless backhaul connection with the upstream base station. Compared with the prior art that a selected upstream base station cannot meet a backhaul requirement for a to-be-accessed MR because a channel capacity between a to-be-accessed base station and each accessed MR cannot represent a real backhaul capability of the accessed MR, in this embodiment of the present invention, the centralized control node can obtain the valid backhaul capabilities of all the base stations. Because the valid backhaul capability can represent a real maximum capability of a base station to serve a newly-added backhaul service, the upstream base station that can meet a backhaul service requirement for the base station can be determined for each base station according to the valid backhaul capability of the base station and the KPI. In addition, the centralized control node uniformly determines the upstream base station for each base station, performance of an entire wireless network can be ensured, and a case in which the selected upstream base station cannot meet a backhaul service requirement for the first base station does not occur.

Figure 6:
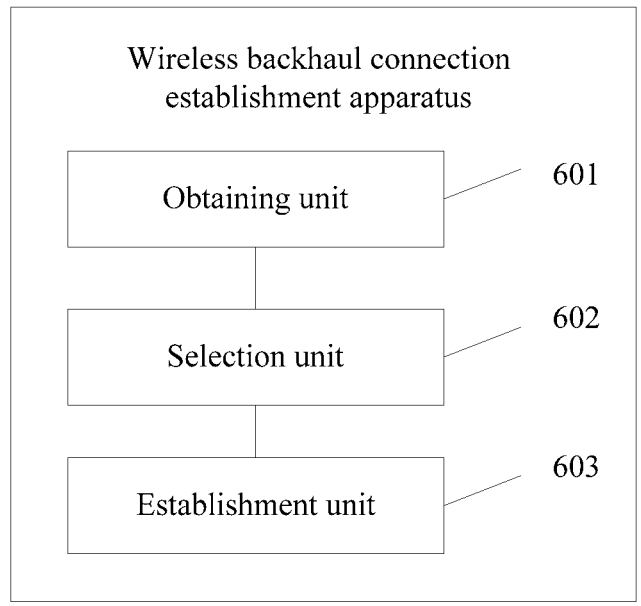
FIG. 6 is a schematic diagram of a logical structure of a wireless backhaul connection establishment apparatus according to an embodiment of the present invention.

Corresponding to the foregoing method embodiments, an embodiment of the present invention further provides a wireless backhaul connection establishment apparatus. The apparatus may be a first base station, or is integrated into the first base station as a functional module. As shown in FIG. 6, the apparatus includes an obtaining unit 601, a selection unit 602, and an establishment unit 603.

The obtaining unit 601 is configured to obtain a valid backhaul capability of a neighboring base station, where the neighboring base station is a base station that can perform wireless communication with the first base station, and the valid backhaul capability reflects a maximum capability of a base station to serve a newly-added backhaul service.

The valid backhaul capability of the neighboring base station includes at least one of the following parameters: a valid backhaul capacity of the neighboring base station, a hop count and an average delay from the neighboring base station to a gateway, path reliability between the neighboring base station and the gateway, a quantity of valid radio frequency channels, or a quantity of valid carriers.

The valid backhaul capacity is a remaining idle capacity after a total capacity from the neighboring base station to the gateway is occupied by a current backhaul service.

The hop count from the neighboring base station to the gateway is a quantity of base stations included in the path between the neighboring base station and the gateway, and the average delay is an average value of delays when the neighboring base station transmits backhaul data to the gateway by using different wireless backhaul paths.

The path reliability between the neighboring base station and the gateway is a percentage of normal working time of the path in total working time.

The quantity of valid radio frequency channels is a quantity of available idle radio frequency channels of the neighboring base station.

The quantity of valid carriers is a quantity of spectrums that can be used by the neighboring base station to perform wireless transmission.

The selection unit 602 is configured to select an upstream base station from the neighboring base station according to the valid backhaul capability of the neighboring base station and a backhaul service requirement for the first base station, where the upstream base station is configured to provide a wireless backhaul relay service for the first base station.

The establishment unit 603 is configured to establish a wireless backhaul connection with the upstream base station selected by the selection unit 602.

In another embodiment of the present invention, the obtaining unit 601 is further configured to receive a broadcast message of the neighboring base station, where the broadcast message includes the valid backhaul capability of the neighboring base station.

The obtaining unit 601 is further configured to: send a request message to the neighboring base station, where the request message indicates a request for the valid backhaul capability of the neighboring base station; and receive a request response of the neighboring base station, where the request response includes the valid backhaul capability of the neighboring base station.

Figure 7:
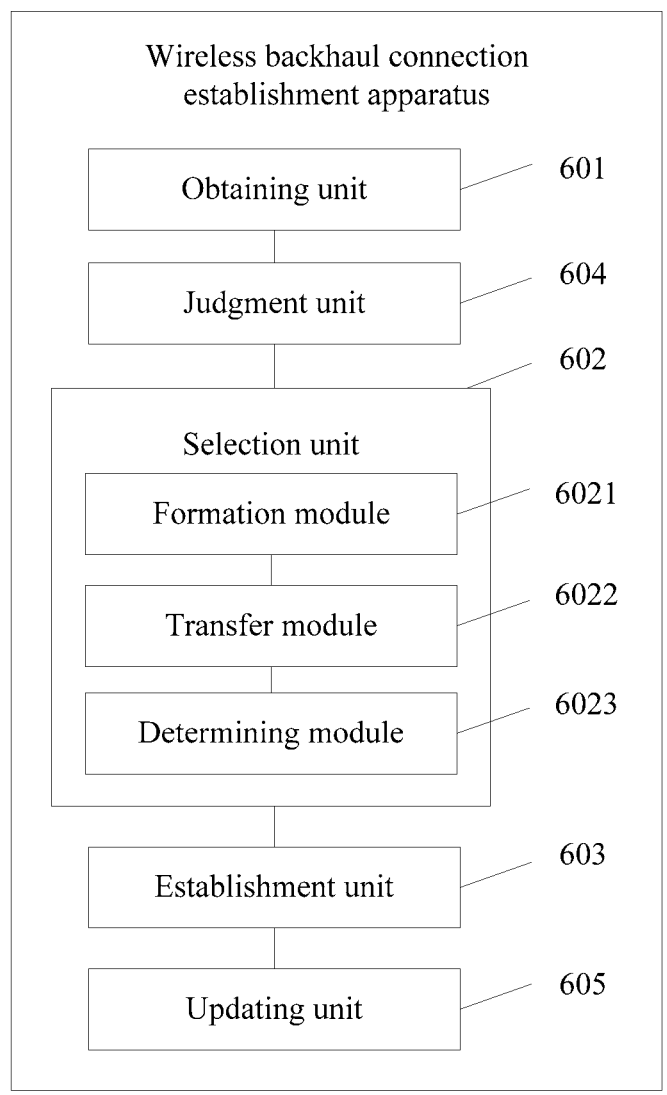
FIG. 7 is a schematic diagram of a logical structure of another wireless backhaul connection establishment apparatus according to an embodiment of the present invention.

In another embodiment of the present invention, as shown in FIG. 7, the apparatus further includes a judgment unit 604 and an updating unit 605, and the selection unit 602 includes a formation module 6021, a transfer module 6022, and a determining module 6023.

The formation module 6021 is configured to form, according to the valid backhaul capability of the neighboring base station, a first set comprising a neighboring base station that meets a first performance indicator, where the first performance indicator includes at least one parameter of the valid backhaul capability.

The transfer module 6022 is configured to: when the first set is not empty, transfer a neighboring base station that has an optimal second performance indicator and that is in the first set from the first set to an upstream base station set, where the second performance indicator includes at least one parameter of the valid backhaul capability.

The determining module 6023 is configured to: when a sum of valid backhaul capacities of neighboring base stations in the upstream base station set is greater than or equal to a backhaul capacity required by the first base station, determine all neighboring base stations in the upstream base station set as upstream base stations.

The determining module 6023 is further configured to: when the first set is empty and the sum of the valid backhaul capacities of the neighboring base stations in the upstream base station set is still less than the backhaul capacity required by the first base station, determine all neighboring base stations in the upstream base station set as upstream base stations.

The parameter included in the first performance indicator and the parameter included in the second performance indicator are different.

The judgment unit 604 is configured to determine, according to a valid backhaul capability of a current upstream base station and a backhaul service requirement for an accessed base station, whether an upstream base station needs to be reselected.

The updating unit 605 is configured to update a valid backhaul capability of the accessed base station according to the valid backhaul capability of the current upstream base station of the accessed base station and the backhaul service requirement for the accessed base station.

According to the wireless backhaul connection establishment apparatus provided in this embodiment of the present invention, an obtaining unit obtains a valid backhaul capability of a neighboring base station, a selection unit selects an upstream base station from the neighboring base station according to the valid backhaul capability of the neighboring base station and a backhaul service requirement for a first base station, and an establishment unit establishes a wireless backhaul connection with the upstream base station. Compared with the prior art that a selected upstream base station cannot meet a backhaul requirement for a to-be-accessed MR because a channel capacity between a to-be-accessed base station and each accessed MR cannot represent a real backhaul capability of the accessed MR, in this embodiment of the present invention, the first base station can obtain the valid backhaul capability of the neighboring base station. Because the valid backhaul capability can represent a real maximum capability of a base station to serve a newly-added backhaul service, the neighboring base station that can meet the backhaul service requirement for the first base station can be selected as the upstream base station according to the valid backhaul capability of the neighboring base station and the backhaul service requirement for the first base station, and a case in which the selected upstream base station cannot meet the backhaul service requirement for the first base station does not occur.

Figure 8:
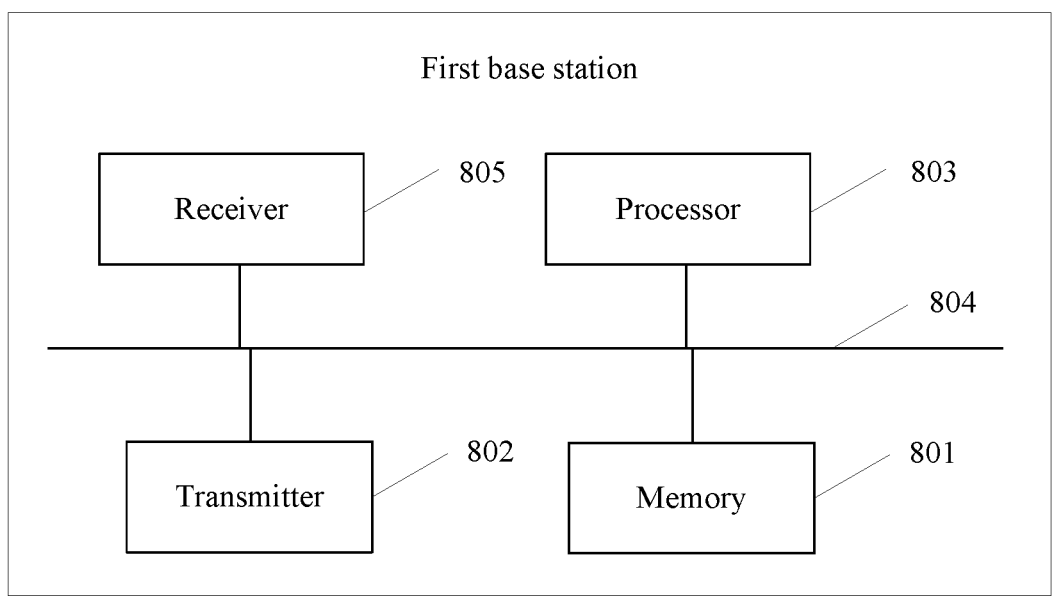
FIG. 8 is a schematic diagram of a logical structure of a first base station of a wireless backhaul connection establishment method according to an embodiment of the present invention.

An embodiment of the present invention further provides a wireless backhaul connection establishment apparatus. As shown in FIG. 8, FIG. 8 is a schematic structural diagram of hardware of the first base station described in FIG. 6. The first base station may include a memory 801, a transmitter 802, a processor 803, a bus 804, and a receiver 805. The memory 801, the transmitter 802, the processor 803, and the receiver 805 are connected and communicate by using the bus 804.

The memory 801 may be a read-only memory (Read Only Memory, ROM), a static storage device, a dynamic storage device, or a random access memory (Random Access Memory, RAM). The memory 801 may store an operating system and another application program. When the technical solutions provided in the embodiments of the present invention are implemented by software or firmware, program code used to implement the technical solutions provided in the embodiments of the present invention is stored in the memory 801, and is executed by the processor 803.

The transmitter 802 and the receiver 805 are configured for communication between the apparatus and another device or communications network (for example, without limitation, an Ethernet, a radio access network (Radio Access Network, RAN), or a wireless local area network (Wireless Local Area Network, WLAN)).

The processor 803 may be a general central processing unit (Central Processing Unit, CPU), a microprocessor, an application-specific integrated circuit (Application Specific Integrated Circuit, ASIC), or one or more integrated circuits, and is configured to execute a related program, so as to implement the technical solutions provided in the embodiments of the present invention.

It should be noted that, although for the hardware, only the memory 801, the transmitter 802, the receiver 805, the processor 803, and the bus 804 are shown in FIG. 8, in a specific implementation process, a person skilled in the art should understand that the first base station further includes another component required for implementing normal running. In addition, according to a specific requirement, a person skilled in the art should understand that a hardware component for implementing another function may further be included.

Specifically, when the first base station shown in FIG. 8 is configured to implement the apparatus of the embodiment shown in FIG. 6, the receiver 805 in the apparatus is configured to obtain a valid backhaul capability of a neighboring base station, where the neighboring base station is a base station that can perform wireless communication with the first base station, and the valid backhaul capability reflects a maximum capability of a base station to serve a newly-added backhaul service.

The valid backhaul capability of the neighboring base station includes at least one of the following parameters: a valid backhaul capacity of the neighboring base station, a hop count and an average delay from the neighboring base station to a gateway, path reliability between the neighboring base station and the gateway, a quantity of valid radio frequency channels, or a quantity of valid carriers.

The valid backhaul capacity is a remaining idle capacity after a total capacity from the neighboring base station to the gateway is occupied by a current backhaul service.

The hop count from the neighboring base station to the gateway is a quantity of base stations included in the path between the neighboring base station and the gateway, and the average delay is an average value of delays when the neighboring base station transmits backhaul data to the gateway by using different wireless backhaul paths.

The path reliability between the neighboring base station and the gateway is a percentage of normal working time of the path in total working time.

The quantity of valid radio frequency channels is a quantity of available idle radio frequency channels of the neighboring base station.

The quantity of valid carriers is a quantity of spectrums that can be used by the neighboring base station to perform wireless transmission.

The processor 803 is coupled with the memory 801, the transmitter 802, and the receiver 805, is configured to control execution of a program instruction, and is specifically configured to: select an upstream base station from the neighboring base station according to the valid backhaul capability of the neighboring base station and a backhaul service requirement for the first base station, where the upstream base station is configured to provide a wireless backhaul relay service for the first base station; and establish a wireless backhaul connection with the upstream base station.

The receiver 805 is further configured to receive a broadcast message of the neighboring base station, where the broadcast message includes the valid backhaul capability of the neighboring base station.

The transmitter 802 is further configured to: send a request message to the neighboring base station, where the request message indicates a request for the valid backhaul capability of the neighboring base station; and receive a request response of the neighboring base station, where the request response includes the valid backhaul capability of the neighboring base station.

The processor 803 is further configured to: form, according to the valid backhaul capability of the neighboring base station, a first set comprising a neighboring base station that meets a first performance indicator, where the first performance indicator includes at least one parameter of the valid backhaul capability; when the first set is not empty, transfer a neighboring base station that has an optimal second performance indicator and that is in the first set from the first set to an upstream base station set, where the second performance indicator includes at least one parameter of the valid backhaul capability; determine whether a sum of valid backhaul capacities of neighboring base stations in the upstream base station set is greater than or equal to a backhaul capacity required by the first base station; when the sum of the valid backhaul capacities of the neighboring base stations in the upstream base station set is greater than or equal to the backhaul capacity required by the first base station, determine all neighboring base stations in the upstream base station set as upstream base stations; and when the first set is empty and the sum of the valid backhaul capacities of the neighboring base stations in the upstream base station set is still less than the backhaul capacity required by the first base station, determine all neighboring base stations in the upstream base station set as upstream base stations.

The parameter included in the first performance indicator and the parameter included in the second performance indicator are different.

The processor 803 is further configured to determine, according to a valid backhaul capability of a current upstream base station and a backhaul service requirement for an accessed base station, whether an upstream base station needs to be reselected.

The processor 803 is further configured to update a valid backhaul capability of the accessed base station according to the valid backhaul capability of the current upstream base station of the accessed base station and the backhaul service requirement for the accessed base station.

It should be noted that the receiver 805 is configured to perform steps of receiving and obtaining information in the foregoing method embodiments, the transmitter 802 is configured to perform a step of sending the information in the foregoing method embodiments, and the processor 803 is configured to execute a processing process in the foregoing method embodiments, for example, perform steps of selecting a base station in the first set, determining the upstream base station, and establishing a wireless connection.

According to the wireless backhaul connection establishment apparatus provided in this embodiment of the present invention, a receiver obtains a valid backhaul capability of a neighboring base station, a processor selects an upstream base station from the neighboring base station according to the valid backhaul capability of the neighboring base station and a backhaul service requirement for a first base station, and an establishment unit establishes a wireless backhaul connection with the upstream base station. Compared with the prior art that a selected upstream base station cannot meet a backhaul requirement for a to-be-accessed MR because a channel capacity between a to-be-accessed base station and each accessed MR cannot represent a real backhaul capability of the accessed MR, in this embodiment of the present invention, the first base station can obtain the valid backhaul capability of the neighboring base station. Because the valid backhaul capability can represent a real maximum capability of a base station to serve a newly-added backhaul service, the neighboring base station that can meet the backhaul service requirement for the first base station can be selected as the upstream base station according to the valid backhaul capability of the neighboring base station and the backhaul service requirement for the first base station, and a case in which the selected upstream base station cannot meet the backhaul service requirement for the first base station does not occur.

Based on the foregoing descriptions of the implementations, a person skilled in the art may clearly understand that the present invention may be implemented by software in addition to necessary universal hardware or by hardware only. In most circumstances, the former is a implementation. Based on such an understanding, the technical solutions of the present invention essentially or the part contributing to the prior art may be implemented in a form of a software product. The software product is stored in a readable storage medium, such as a floppy disk, a hard disk or an optical disc of a computer, and includes several instructions for instructing a computer device (which may be a personal computer, a server, or a network device) to perform the methods described in the embodiments of the present invention.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A wireless backhaul connection establishment method, wherein the method comprises:
    obtaining, by a first base station, a valid backhaul capability of a neighboring base station, wherein the neighboring base station is a base station that can perform wireless communication with the first base station, and the valid backhaul capability reflects a maximum capability of a base station to serve a newly-added backhaul service;
    selecting, by the first base station, an upstream base station from the neighboring base station according to the valid backhaul capability of the neighboring base station and a backhaul service requirement for the first base station, wherein the upstream base station is configured to provide a wireless backhaul relay service for the first base station; and
    establishing, by the first base station, a wireless backhaul connection with the upstream base station;
    wherein the valid backhaul capability of the neighboring base station comprises at least one of the following parameters: a valid backhaul capacity of the neighboring base station, a hop count and an average delay from the neighboring base station to a gateway, path reliability between the neighboring base station and the gateway, a quantity of valid radio frequency channels, or a quantity of valid carriers, wherein:
    the valid backhaul capacity is a remaining idle capacity after a total capacity from the neighboring base station to the gateway is occupied by a current backhaul service; and
    the hop count from the neighboring base station to the gateway is a quantity of base stations in the path between the neighboring base station and the gateway, and the average delay from the neighboring base station to the gateway is an average value of delays when the neighboring base station transmits backhaul data to the gateway by using different wireless backhaul paths;
    the path reliability between the neighboring accessed base station and the gateway is a percentage of normal working time of the path in total working time;
    the quantity of valid radio frequency channels is a quantity of available idle radio frequency channels of the neighboring base station; and
    the quantity of valid carriers is a quantity of spectrums that can be used by the neighboring base station to perform wireless transmission.

2. The wireless backhaul connection establishment method according to claim 1, wherein obtaining, by a first base station, the valid backhaul capability of the neighboring base station comprises at least one of:
    receiving, by the first base station, a broadcast message of the neighboring base station, wherein the broadcast message comprises the valid backhaul capability of the neighboring base station;
    sending, by the first base station, a request message to the neighboring base station, wherein the request message indicates a request for the valid backhaul capability of the neighboring base station; and
    receiving, by the first base station, a request response of the neighboring base station, wherein the request response comprises the valid backhaul capability of the neighboring base station.

3. The wireless backhaul connection establishment method according to claim 1, wherein selecting, by the first base station, the upstream base station from the neighboring base station according to the valid backhaul capability of the neighboring base station comprises:
    S1. forming, by the first base station according to the valid backhaul capability of the neighboring base station, a first set comprising a neighboring base station that meets a first performance indicator, wherein the first performance indicator comprises at least one parameter of the valid backhaul capability;
    S2. when the first base station determines that the first set is not empty, transferring a neighboring base station in the first set that has an optimal second performance indicator from the first set to an upstream base station set, wherein the second performance indicator comprises at least one parameter of the valid backhaul capability;

S3. determining, by the first base station, whether a sum of valid backhaul capacities of neighboring base stations in the upstream base station set is greater than or equal to a backhaul capacity required by the first base station;

if it is determined that the sum of valid backhaul capacities of neighboring base stations in the upstream base station set is greater than or equal to a backhaul capacity required by the first base station, determining, by the first base station, all neighboring base stations in the upstream base station set as upstream base stations;

S4. if it is determined that the sum of valid backhaul capacities of neighboring base stations in the upstream base station set is not greater than or equal to a backhaul capacity required by the first base station, cyclically performing steps S2 and S3; and when the first base station determines that the sum of the valid backhaul capacities of the neighboring base stations in the upstream base station set is greater than or equal to the backhaul capacity required by the first base station, determining all neighboring base stations in the upstream base station set as upstream base stations; and when the first set is empty and the sum of the valid backhaul capacities of the neighboring base stations in the upstream base station set is still less than the backhaul capacity required by the first base station, determining all neighboring base stations in the upstream base station set as upstream base stations, wherein the parameter comprised in the first performance indicator and the parameter comprised in the second performance indicator are different.

4. The wireless backhaul connection establishment method according to claim 1, wherein the first base station comprises an accessed base station and an unaccessed base station, the accessed base station is a base station that has accessed a wireless backhaul network, and the unaccessed base station is a base station that prepares to access the wireless backhaul network.

5. The wireless backhaul connection establishment method according to claim 4, wherein when the first base station is the accessed base station, before the selecting, by the first base station, an upstream base station from the neighboring base station according to the valid backhaul capability of the neighboring base station and a backhaul service requirement for the first base station, the method further comprises:

determining, by the accessed base station according to a valid backhaul capability of a current upstream base station and a backhaul service requirement for the accessed base station, whether an upstream base station needs to be reselected.

6. The wireless backhaul connection establishment method according to claim 5, wherein when the first base station is the accessed base station, after the selecting, by the first base station, an upstream base station from the neighboring base station according to the valid backhaul capability of the neighboring base station, the method further comprises:

updating, by the accessed base station, a valid backhaul capability of the accessed base station according to the valid backhaul capability of the current upstream base station of the accessed base station and the backhaul service requirement for the accessed base station.

7. A wireless backhaul connection establishment apparatus, wherein the apparatus is a first base station or is integrated into the first base station, and the apparatus comprises:

a receiver, configured to obtain a valid backhaul capability of a neighboring base station, wherein the neighboring base station is a base station that can perform wireless communication with the first base station, and the valid backhaul capability reflects a maximum capability of a base station to serve a newly-added backhaul service;

a processor, configured to select an upstream base station from the neighboring base station according to the valid backhaul capability of the neighboring base station and a backhaul service requirement for the first base station, wherein the upstream base station is configured to provide a wireless backhaul relay service for the first base station; and a transmitter, configured to establish a wireless backhaul connection with the upstream base station selected by the processor;

wherein the valid backhaul capability of the neighboring base station comprises at least one of the following parameters: a valid backhaul capacity of the neighboring base station, a hop count and an average delay from the neighboring base station to a gateway, path reliability between the neighboring base station and the gateway, a quantity of valid radio frequency channels, or a quantity of valid carriers;

the valid backhaul capacity is a remaining idle capacity after a total capacity from the neighboring base station to the gateway is occupied by a current backhaul service;

the hop count from the neighboring base station to the gateway is a quantity of base stations in the path between the neighboring base station and the gateway, and the average delay is an average value of delays when the neighboring base station transmits backhaul data to the gateway by using different wireless backhaul paths;

the path reliability between the neighboring base station and the gateway is a percentage of normal working time of the path in total working time;

the quantity of valid radio frequency channels is a quantity of available idle radio frequency channels of the neighboring base station; and the quantity of valid carriers is a quantity of spectrums that can be used by the neighboring base station to perform wireless transmission.

8. The wireless backhaul connection establishment apparatus according to claim 7, wherein at least one is met:

the receiver is further configured to receive a broadcast message of the neighboring base station, wherein the broadcast message comprises the valid backhaul capability of the neighboring base station; and the transmitter is further configured to: send a request message to the neighboring base station, wherein the request message indicates a request for the valid backhaul capability of the neighboring base station; and the receiver is further configured to receive a request response of the neighboring base station, wherein the request response comprises the valid backhaul capability of the neighboring base station.

9. The wireless backhaul connection establishment apparatus according to claim 7, wherein the processor is further configured to;

form, according to the valid backhaul capability of the neighboring base station, a first set comprising a neighboring base station that meets a first performance indicator, wherein the first performance indicator comprises at least one parameter of the valid backhaul capability;

when the first set is not empty, transfer a neighboring base station that has an optimal second performance indicator and that is in the first set from the first set to an upstream base station set, wherein the second performance indicator comprises at least one parameter of the valid backhaul capability;

when a sum of valid backhaul capacities of neighboring base stations in the upstream base station set is greater than or equal to a backhaul capacity required by the first base station, determine all neighboring base stations in the upstream base station set as upstream base stations; and when the first set is empty and the sum of the valid backhaul capacities of the neighboring base stations in the upstream base station set is still less than the backhaul capacity required by the first base station, determine all neighboring base stations in the upstream base station set as upstream base stations, wherein the parameter comprised in the first performance indicator and the parameter comprised in the second performance indicator are different.

10. The wireless backhaul connection establishment apparatus according to claim 7, when the first base station is an accessed base station wherein the processor is further configured to:
  determine, according to a valid backhaul capability of a current upstream base station and a backhaul service requirement for an accessed base station, whether an upstream base station needs to be reselected.

11. The wireless backhaul connection establishment apparatus according to claim 10, wherein the processor is further configured to:
  update a valid backhaul capability of the accessed base station according to the valid backhaul capability of the current upstream base station of the accessed base station and the backhaul service requirement for the accessed base station.

* * * * *